C. W. THUROW.
PLOW.
APPLICATION FILED MAR. 18, 1911.

1,050,314.

Patented Jan. 14, 1913.

Attest:
Ewd L. Tolson
Edward N. Sauter

Inventor
Carl W. Thurow,
by Spear, Middleton, Donaldson & Spear
Atty's.

UNITED STATES PATENT OFFICE.

CARL W. THUROW, OF RAMONA, SOUTH DAKOTA.

PLOW.

1,050,314. Specification of Letters Patent. Patented Jan. 14, 1913.

Application filed March 18, 1911. Serial No. 615,352.

*To all whom it may concern:*

Be it known that I, CARL W. THUROW, citizen of the United States, residing at Ramona, South Dakota, have invented certain new and useful Improvements in Plows, of which the following is a specification.

My invention relates to plows of the sulky or gang type and particularly to that form of plow in which the plow shares are carried upon a beam having vertical movement in relation to the frame, and it is the object of my invention to provide means whereby the plow shares will be controlled to keep them at work in the ground and to prevent them from lifting when, for instance, the plow is going down hill.

The invention is shown in the accompanying drawings in which—

Figure 1:
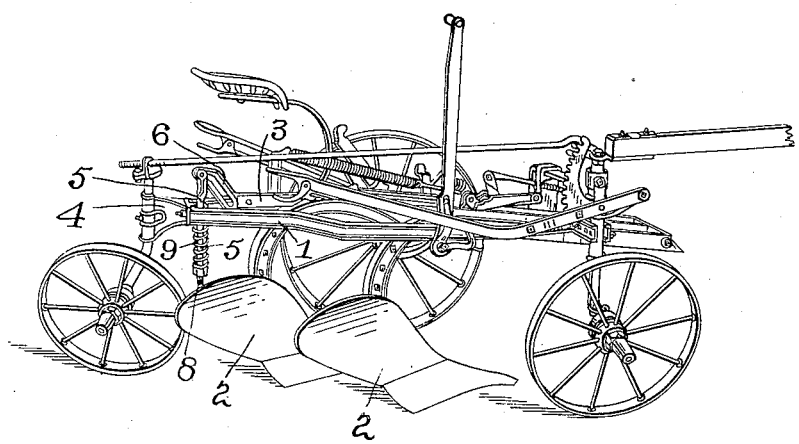
Figure 2:
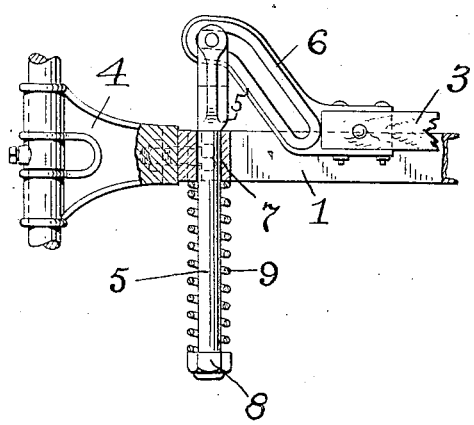
Figure 3:
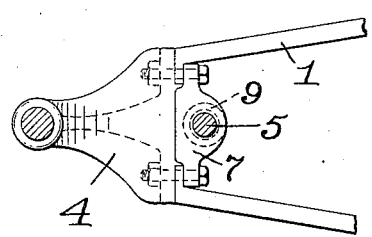

Figure 1 is a perspective view of a plow. Fig. 2 is a detail sectional view taken vertically at the rear of the plow frame, and Fig. 3 is a plan view of the rear end of the frame with parts in section.

In these drawings, 1 indicates the frame of the plow, this being of the sulky type and having the usual carrying wheels.

2 indicates the plow share or shares supported from the beam 3. The frame bars converge at their rear ends and at these rear ends the bracket 4 is connected, said bracket supporting the rear wheel. In order to keep the beam carrying the plow share or shares in proper relation to the frame to maintain the plow shares at work I employ a rod 5, connected at its upper end with the slotted member 6, in turn secured to the rear end of the plow beam, said vertically extending rod passing down through a bearing 7 bolted in position between the rear ends of the frame bars. As shown, the rod 5 is provided with a shoulder 5' near the top thereof for limiting the downward motion of the rod. This vertically extending rod has a nut or enlargement at its lower end at 8, and between this and the under face of the bearing block 7 a spring 9 is interposed tending constantly to force the rod downwardly together with the plow beam in relation to the frame. By this means the plow is kept properly at work under all conditions, such for instance, as working on the hillside.

I claim as my invention:—

In a plow of the sulky type, the combination of a frame, a plow beam movable in relation to the frame and carrying a plow share, a vertically extending rod connected with the rear upturned end of the beam of the sulky plow, a bearing at the rear end of the frame through which the rod extends, and a spring surrounding the rod tending to force the same downwardly, said spring bearing on the under side of the frame and upon an enlargement of the rod at its lower end, said spring being wholly below the plow share carrying beam substantially as described.

In testimony whereof, I affix my signature in presence of two witnesses.

CARL W. THUROW.

Witnesses:
 JOHN S. STEVENS,
 J. A DERAGISCH, Jr.

Copies of this patent may be obtained for five cents each, by addressing the "Commissioner of Patents, Washington, D. C."